(12) United States Patent
Kluker et al.

(10) Patent No.: US 9,493,248 B1
(45) Date of Patent: Nov. 15, 2016

(54) REMOTE DISPLAY OF FLIGHT DECK INFORMATION FROM A LEGACY DISPLAY SYSTEM

(71) Applicant: Rockwell Collins, Inc., Cedar Rapids, IA (US)

(72) Inventors: Anthony Kluker, Cedar Rapids, IA (US); Dean M. Galus, Walford, IA (US); Charles E. Swafford, Iowa City, IA (US); Jeffrey E. Fetta, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 632 days.

(21) Appl. No.: 13/629,802

(22) Filed: Sep. 28, 2012

(51) Int. Cl.
*G06F 15/16* (2006.01)
*B64D 45/00* (2006.01)

(52) U.S. Cl.
CPC ..................................... *B64D 45/00* (2013.01)

(58) Field of Classification Search
CPC .......................................................... G01S 7/06
USPC ........................................................... 345/502
See application file for complete search history.

(56) References Cited

U.S. PATENT DOCUMENTS

| 5,165,240 A * | 11/1992 | Page ...................... B64C 11/50 60/719 |
| 5,761,625 A * | 6/1998 | Honcik et al. .................. 701/14 |
| 2003/0179939 A1* | 9/2003 | Kim .............................. 382/232 |
| 2005/0280662 A1* | 12/2005 | Tognoni et al. .............. 345/690 |

* cited by examiner

*Primary Examiner* — Kyle Zhai
(74) *Attorney, Agent, or Firm* — Angel N. Gerdzhikov; Donna P. Suchy; Daniel M. Barbieri

(57) ABSTRACT

A liquid crystal display (LCD) only Engine Indicating and Crew Alerting System (EICAS) for Boeing 757 and Boeing 767 aircraft which utilizes Engine Alert Processors from a previously certified CRT EICAS and minimizes changes in hardware and software design by simultaneously generating both cathode ray tube (CRT) drive commands and LCD drive commands while only using the LCD drive commands for display of EICAS information during flight.

10 Claims, 5 Drawing Sheets

REMOTE DISPLAY OF FLIGHT DECK INFORMATION FROM A LEGACY DISPLAY SYSTEM

FIELD OF THE INVENTION

The present invention generally relates to aviation electronics and more particularly to cockpit display avionics for large commercial air transport aircraft.

BACKGROUND OF THE INVENTION

In the commercial aviation industry, it is well known that equipment that is critical for safety of flight must undergo extensive and expensive review by governmental aviation authorities so as to assure a very high level of reliability and availability. Once a piece of avionics equipment is fully approved, the desire to make small changes or upgrades, for example for aesthetic or economic improvements therein is often dominated and over shadowed by the high cost of recertification.

Cathode ray tubes (CRTs) are an example of equipment which is being replaced by liquid crystal displays (LCDs) in most newly designed commercial air transport aircraft. However, many newly manufactured previously designed aircraft are being made today with CRTs because of the high cost of recertification. One example would be the Engine Indicating and Crew Alerting System (EICAS) for Boeing 757 and 767 aircraft. The primary functions of the 757/767 EICAS are to monitor various engine and aircraft parameters and to provide indications of the values of those parameters to the crew, along with appropriate warnings and alerts triggered by the states of those parameters.

Now referring to FIG. 1, there is shown a portion of a prior art EICAS system. These functions are achieved by a system whose normal architecture includes the following Line Replaceable Units (LRU): two Engine Alert Processors (EAP), a single Display Select Panel (DSP), a Cancel/Recall Panel, a single Maintenance Panel, and two Display Units (DUs). This is the prior art configuration, the display units are CRTs.

The Engine Alert Processors (EAPs) receive and process various signals from the engines and the aircraft. These signals include both analog and digital data and control information. Each EAP in a given installation is identical, and is "strapped" via program pins for the particular engines on the aircraft. This functionality of the EAP is deeply ingrained in the currently certified EAPs.

The Display Select Panel (DSP) is the primary point of crew control for the EICAS. It receives analog discrete inputs from the Maintenance Panel and Cancel/Recall Panel and transmits this information to the EAPs to control the displayed format and parameters.

The DUs receive video signals from the EAPs and create the commanded displays. The DUs are identical, but independent in their operation. The DUs perform as a system with one DU presenting primary engine parameters continuously and caution and warning messages as required. The second DU continuously presents fuel flow, when Operational Program Configuration (OPC) is selected, and displays the remaining engine parameters when selected or automatically when the computer detects a parameter exceedance.

The left and right EAPs (in the center of the diagram) use inputs from the various interfacing systems to generate video signals that are routed to a switch relay card. Both EAPs produce video signals based on their inputs. The Display Select Panel (DSP) provides a means to determine which EAP will drive the DUs (only one EAP drives both DUs). The COMPUTER SELECT signal (shown in the diagram from the DSP to the switch relay card) determines which video signals will be used to drive the DUs.

A more detailed understanding of the prior art 757/767 EICAS EAP can be aided by now referring to FIGS. 2 and 3 which show an internal block diagram of the EAP and a description of the EAP's functions, together with a representation of the EAP data flow.

Engine Alert Processor (EAP)
Purpose:
Samples and conditions sensor input information.
Transmits the information to other systems.
Selects and constructs the pictures to appear on each DU.
Monitors the system's health and selects the system's response to combinations of faults.
Structure:
The EAP is partitioned into three major subsystems. They are the System Processor (SP), the Input/Output Controller (IOC) and the Display Generator (DG). The three major subsystems operate independently and asynchronously except as described in Dynamic Operation. All communications between the three subsystems are accomplished by exchanging data in shared memories. The SP and the IOC share the Input/Output Buffer (IOB). It appears to each to be random access, read/write, volatile memory in their own address space. Several other hardware systems help these major subsystems function properly.

System Processor (SP)
The SP defines the functional and dynamic behavior of the system. It:
conditions sensor input data and formats it for display and transmission; selects the information to display on each DU.
alerts the crew to conditions requiring their attention.
tests itself, monitors the health of the rest of the system, and selects the system's responses to failures.

I/O Controller (IOC)
The IOC:
transfers data between the SPs memory and the EAPs electrical interfaces except those associated with DUs.
conceals signal distribution and interface timing requirements from the SP.
converts between electrical and digital signal representations and vice versa, but does not condition or format the information.
is responsible for all functional requirements related to I/O signals.

Display Generator (DG)
The DG:
translates the display information selected by the SP into deflection and video control signals while maintaining a sufficiently high refresh rate to avoid observable flickers.

Program Memory (PM)
stores SP, IOC and DG instructions and constant data.

Scratch Pad Memory (SPM)
stores variable data which does not need to be retained after a long power outage.

Non-Volatile Memory (NVM)
A bank of memory used to store variable data which must be retained after an indefinitely long power outage.

Video/Timing Generator (VTG)
provides a 20 Hz signal to the SP and DG.
provides all signals required by the display refresh circuitry.

Power Supply (PS)

converts 400 Hz AC power for internal use.

provides signals required to manage power outages gracefully.

Two of these signals, PDNF and PLONGF, are routed to a register on the A11 card which the SP can read.

PLONGF, although logically is a signal from the power supply, it is an indicator of whether the external power went away for longer than 200 msec.

Normal Operation:

The EAP data flow is represented in FIG. 3 and FIG. 4. The IOC and DG are essentially peripheral interfaces to the SP. The SP defines the functional and dynamic behavior of the system because it closes the data paths from system inputs to system and display outputs. The SP samples and conditions input data stored in the I/O Buffer (IOB) by the IOC. It updates output data in the IOB which the IOC transmits. The SP selects the displays to appear on each DU and updates Dynamic Information.

The IOC is nearly transparent to the SP. With the exception of DITS-33 Block Data, which does not concern much of the system, every input and output quantity is assigned a fixed location in the IOB. The SP treats each location as if it were directly attached to the transmitting/receiving device. In order to sample an input or update an output, the SP simply references the associated location in the IOB. Every quantity is independent of all others. The SP may reference them in any order at any rate regardless of the state of the IOC. If a quantity requires more than one word in the IOB, the IOC and the SP each read or update the entire quantity in one transaction so neither ever obtains a partially updated value.

The DG generates deflection and video signals to draw each of the displays selected by the SP. Based upon these selections, it processes the features to appear on each page.

Generally speaking, the SP, the IOC, and the DG operate independently. What little control the SP exercises over the IOC and the DG is accomplished through the Activity Interface words in shared memory.

The EAP as described above has been certified by the Federal Aviation Administration (FAA) and is in wide commercial use around the world. The EAP as described is commercially available for purchase directly from Rockwell Collins Inc., of Cedar Rapids, Iowa USA and is also available around the world from numerous spare parts and maintenance supplying companies.

While the EAP has enjoyed much commercial success in the past, in some applications the fact that the DUs are only CRTs may be considered today by some to be a shortcoming.

Consequently, there exists a need, in some applications, for improved EICAS systems for Boeing 757/767 aircraft.

SUMMARY OF THE INVENTION

It is an object of the present invention to provide a system and method for efficiently improving the display devices in a 757/767 EICAS system.

It is a feature of the present invention to utilize a display generator which outputs stroke and/or raster commands on a video out line which is free of any connection with any display when it is in a configuration certified for airworthiness by a governmental aviation regulatory entity.

It is another feature of the present invention to include an EAP signal processor software which packs a combination of internal and display generator data into ARINC 429 labels.

It is yet another feature of the present invention to utilize a GGU-2100 which includes an EICAS software application, which "knows" what EICAS format is to be displayed based upon the data received in the ARINC 429 labels.

It is still another feature of the present invention to include hard wired upper and lower DU status signals which provides data to the EAP to mimic correctly operating CRT DUs.

It is an advantage of the present invention to improve the ability to convert an EICAS system from a CRT DU to liquid crystal displays while avoiding hardware changes to the EAP and minimizing software changes in the EAP software.

The present invention is a system and method for economically redesigning an EICAS, which invention is designed to satisfy the aforementioned needs, provide the previously stated objects, include the above-listed features, and achieve the already articulated advantages.

Accordingly, the present invention is a system and method including:

an engine indicating and crew alerting system (EICAS) comprising:

a plurality of engine alert processors (EAPs), each of which comprises an input output controller (IOC); an input output buffer random access memory (RAM), a signal processor (SP), shared RAM, and a display generator (DG), wherein said SP is configured with software to pack graphics display data, where said graphics display data is representative of information provided to and used by the DG for generating cathode ray tube (CRT) drive commands;

a display select panel (DSP);

one or more graphics generator units (GGU) which process the data from the EAP Signal Processor; and a display device comprising a rectangular array of individually addressable pixels which receive LCD drive commands, which do not include and are not created using said CRT drive commands, where said LCD drive commands are provided via a non-electron beam connection with said GGU.

DETAILED DESCRIPTION

Figure 1:
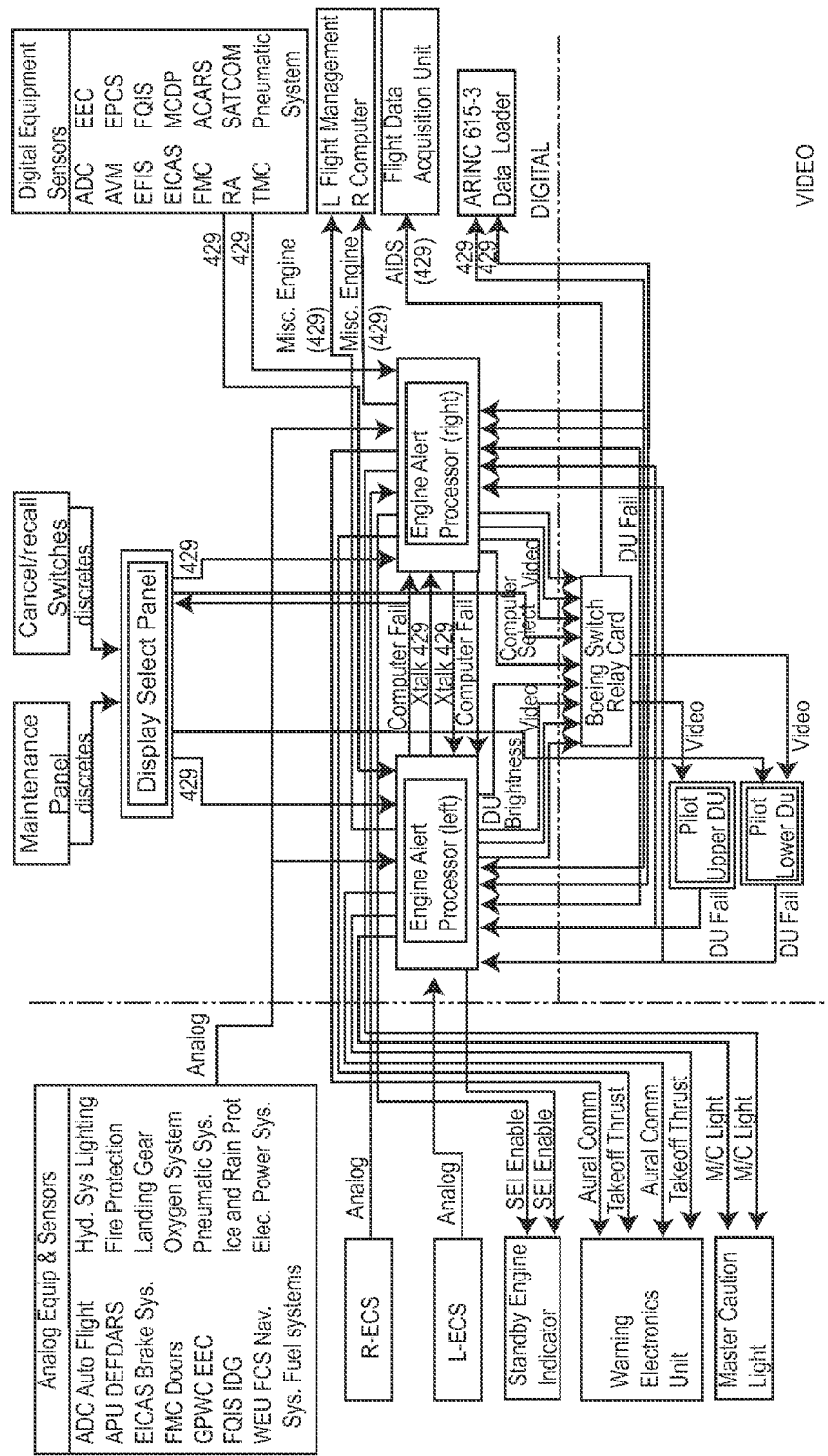
FIG. 1 is a simplified block diagram of an EICAS system of the prior art.
Figure 2:
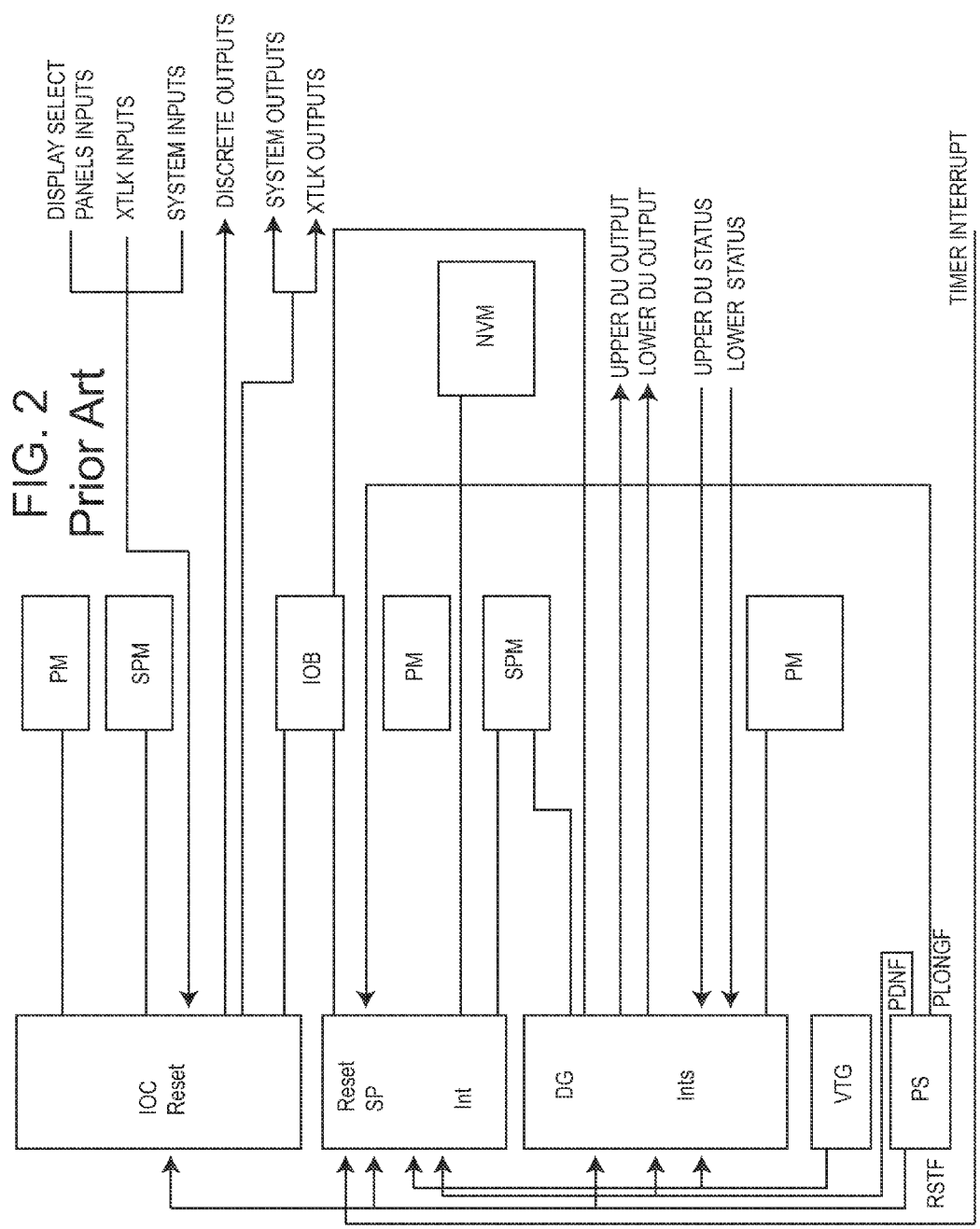
FIG. 2 is a simplified block diagram of an EAP of the EICAS system of the prior art of FIG. 1.
Figure 3:
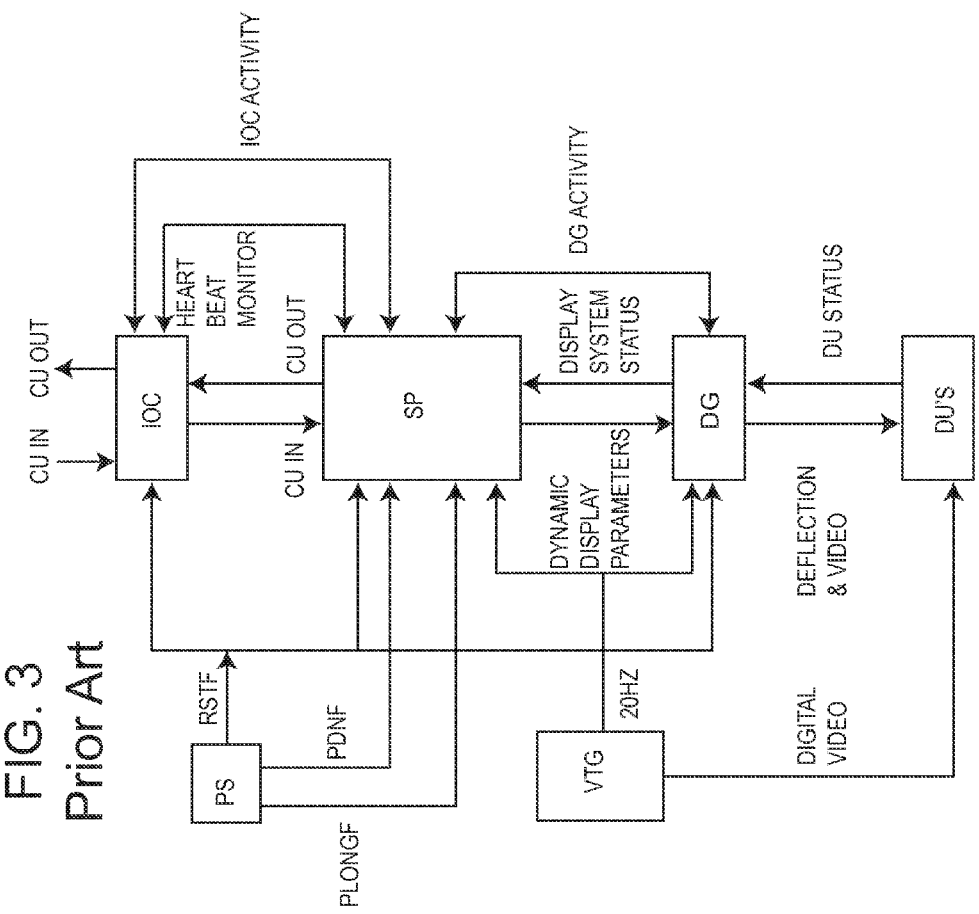
FIG. 3 is a more detailed block diagram of data flow of the EAP of the prior art of FIG. 2.
Figure 4:
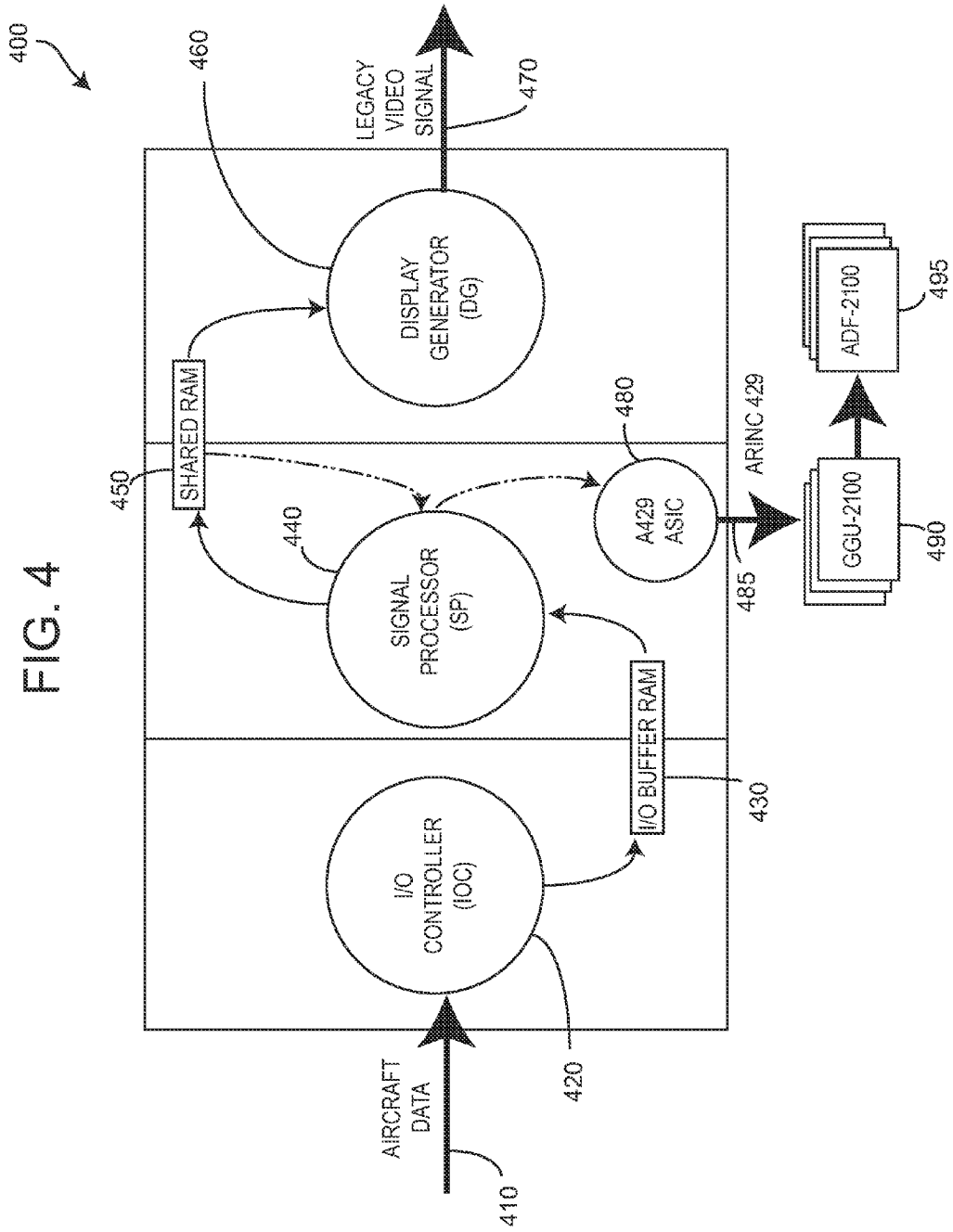
FIG. 4 is a simple block diagram of data flow of the EAP of the present invention, where the dotted lines from the shared RAM to the SP and from the SP to the ARINC 429 ASIC are new dataflow paths from the prior art EAP.

Now referring to the figures, where like numerals refer to like matter throughout, and more particularly in FIG. 4 there is shown a simplified block diagram of the data flows of the EICAS of the present invention which includes an EAP 400, a port 410, which is representative of several ports for receiving aircraft data into the EAP 400, an input/output controller 420 which services ARINC 429 receivers and transmits ARINC 429 data, etc. and which is similar or identical to prior art I/O controllers from legacy EAPs, I/O buffer RAM 430 is disposed between I/O controller 420 and SP 440, which performs various functions including source selection, filtering and form arrangements. SP 440 is similar or identical to prior art SPs from legacy EAPs. In normal operation of prior art EAPs the SP provides its output to a Shared Ram 450 which is then provided to the DG 460 which converts the data from the shared RAM 450 into stroke and raster commands for a CRT display device. In the present invention the I/O Buffer 430, Shared Ram 450 and DG 460 as well as output port 470 are identical to corresponding structure in prior art legacy systems. ARINC 429 ASIC 480 is shown disposed between the SP 440 and the GGU 490, which is coupled to the liquid crystal displays 495.

Figure 5:
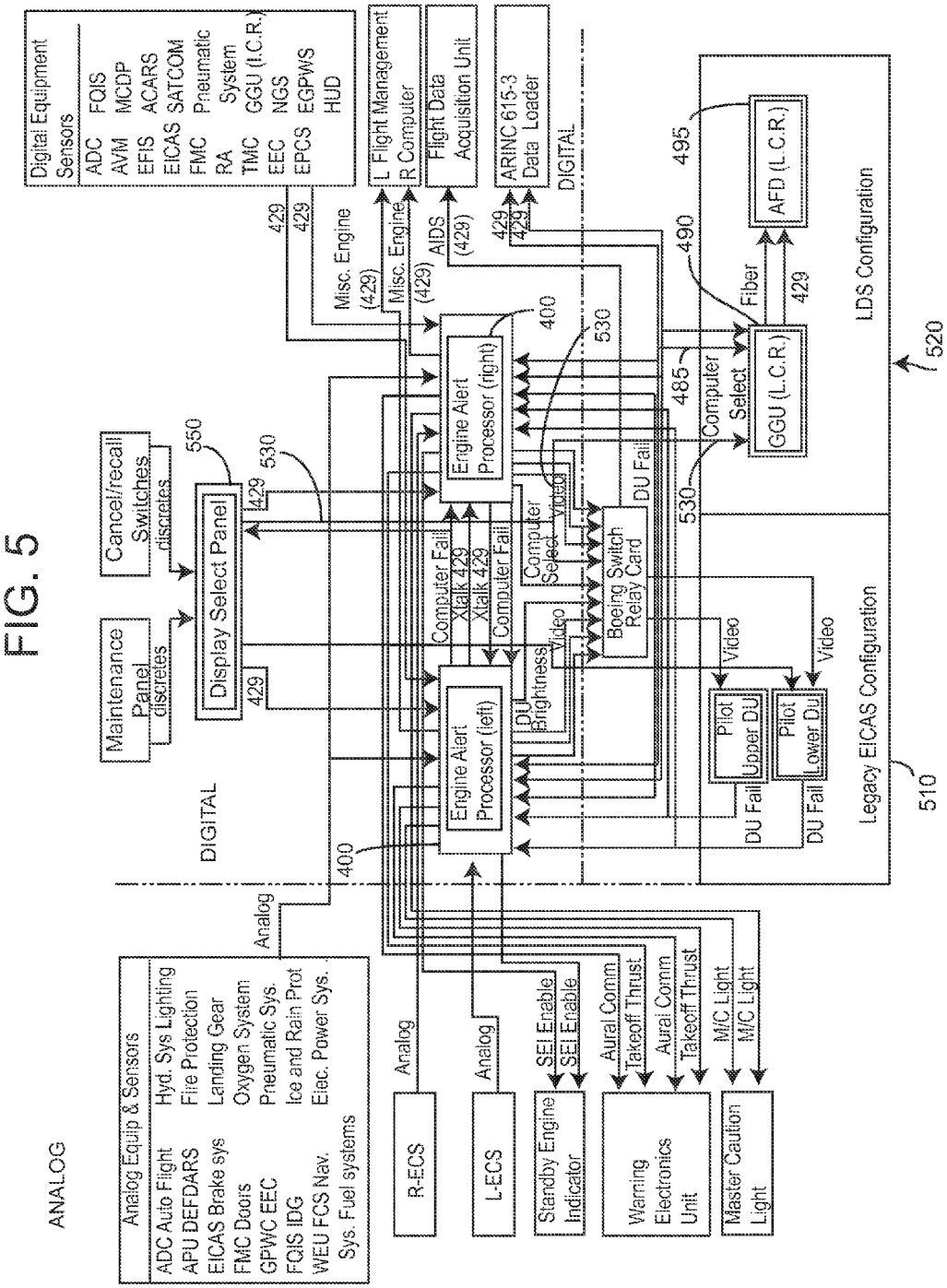
FIG. 5 is a more detailed block diagram of structure of an improved EICAS system of the present invention.

Now referring to FIGS. 4 and 5, the EAPs 400 will transmit EICAS display information to the GGUs 490 via ARINC 429 output bus 485 that was present in legacy EAPs. There are no hardware changes to the EAPs in order to send the ARINC 429 data to the GGUs 490. The EAP Signal Processor 440 software will pack a combination of internal and Display Generator 460 data into ARINC 429 labels for transmission to the GGUs 490. The software to determine what data to pack for transmission to the GGUs 490 is new for the present invention. The design of the new Signal Processor 440 software is based on "knowing" what EICAS format is to be displayed, and packing the data that is needed by the GGU to create the display. The EICAS software application in the GGU will "know" what display format is to be displayed based on the data received from the EAP. The EICAS software application in the GGU 490 will process the EICAS display information and, with the assistance of an ARINC 661 Graphics Server (AGS), will transmit a digital video signal to the AFD 495s in order to create the display. FIG. 5 shows both the prior art (identified as the Legacy EICAS configuration 510) and present invention (identified as the LDS STC configuration 520). In the new configuration, the 2 DUs shown in the Legacy EICAS configuration block 510 would not be present and the signals to the DUs (DU BRIGHTNESS from the DSP, the 2 video signals from the switch relay card) and from the DUs (DU FAIL signals) would not be present either. In the new configuration, the COMPUTER SELECT signal 530 (shown in the diagram from the Display Select panel to the GGUs) determines which ARINC 429 bus from the EAPs (1 bus from the left EAP and 1 bus from the right EAP) will be used by the GGUs to generate the EICAS display. In the new configuration, the EAPs 400 will still generate the video signals shown in the diagram, but since there won't be any CRT DUs present, these video signals will not be used. The EAPs 400 will output data on an existing ARINC 429 output bus 485 that will be used instead of the video signals from the EAPs to generate the EICAS display, the DSP 550 will determine which EAP 400 and therefore which ARINC 429 output 485 will be used by the GGUs 490 to generate the digital video signal for the Adaptive Flight Displays (LCDs) 495.

It is thought that the method and apparatus of the present invention will be understood from the foregoing description and that it will be apparent that various changes may be made in the form, construct steps, and arrangement of the parts and steps thereof, without departing from the spirit and scope of the invention or sacrificing all of their material advantages. The form herein described is merely a preferred exemplary embodiment thereof.

We claim:

1. An engine indicating and crew alerting system (EICAS) comprising:
   a plurality of engine alert processors (EAPs), each EAP comprises an input/output controller (IOC); an input/output buffer random access memory (RAM), a signal processor (SP), shared RAM, and a display generator (DG),
   wherein said SP is configured with software to pack graphics display data, where said graphics display data is representative of information provided to and used by the DG for generating cathode ray tube (CRT) drive commands, said SP further configured with software to pack internal data and DG data into ARINC (Aeronautical Radio INC.) 429 labels for transmission;
   one or more graphics generator units (GGU), the one or more graphics generator units configured to receive internal data and DG data with ARINC 429 labels, the one or more graphics generator units being configured to generate LCD drive commands from the internal data and the DG data with ARINC 429 labels, wherein the one or more graphics generator units create the LCD drive commands in accordance with a particular EICAS format based upon the internal data and DG data with ARINC 429 labels; and
   a display device comprising a rectangular array of individually addressable pixels which receive said LCD drive commands, which do not include and are not created using said CRT drive commands, where said LCD drive commands are provided via a non-electron beam connection with said GGU.

2. The system of claim 1 further comprising:
   a ARINC 429 application specific integrated circuit (ASIC) receiving the internal data and the DG data with ARINC 429 labels from the SP; and
   a ARINC 429 bus coupled with said ARINC 429 application specific integrated circuit (ASIC).

3. The system of claim 1 wherein said DG has a video out port which is free of any coupling which would use a video signal from said video out port to at least aid in causing a video image to be displayed by a CRT display.

4. The system of claim 1 wherein said software of the SP includes the particular EICAS format to be employed for the display device.

5. The system of claim 4, further comprising a CRT display.

6. The system of claim 5, wherein said CRT display is configured to receive the CRT drive commands.

7. An engine indicating and crew alerting system (EICAS) comprising:
   a plurality of engine alert processors (EAPs), each EAP comprises an input/output controller (IOC); an input/output buffer random access memory (RAM), a signal processor (SP), shared RAM, and a display generator (DG), wherein said SP is configured with software to pack graphics display data, where said graphics display data is representative of information provided to and used by the DG for generating cathode ray tube (CRT) drive commands, said SP further configured with software to pack internal data and DG data into ARINC (Aeronautical Radio INC.) 429 labels, said software for the SP includes a particular EICAS format to be employed for the display device;
   one or more graphics generator units (GGU), the one or more graphics generator units configured to receive internal data and DG data with ARINC 429 labels, the one or more graphics generator units being configured to generate LCD drive commands from the internal data and the DG data with ARINC 429 labels, wherein the one or more graphics generator units create the LCD drive commands in accordance with the particular EICAS format based upon the internal data and DG data with ARINC 429 labels;
a ARINC 429 application specific integrated circuit (ASIC) receiving the internal data and the DG data with ARINC 429 labels from the SP; and
a display device comprising a rectangular array of individually addressable pixels which receive said LCD drive commands, which do not include and are not created using said CRT drive commands, where said LCD drive commands are provided via a non-electron beam connection with said GGU.

8. The system of claim 7 further comprising:
a ARINC 429 bus coupled with said ARINC 429 application specific integrated circuit (ASIC).

9. The system of claim 7, further comprising a CRT display.

10. The system of claim 9, wherein said CRT display is configured to receive the CRT drive commands.

* * * * *